United States Patent
Mohan et al.

(10) Patent No.: US 6,421,817 B1
(45) Date of Patent: *Jul. 16, 2002

(54) SYSTEM AND METHOD OF COMPUTATION IN A PROGRAMMABLE LOGIC DEVICE USING VIRTUAL INSTRUCTIONS

(75) Inventors: Sundararajarao Mohan, Cupertino; Stephen M. Trimberger, San Jose, both of CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/541,530

(22) Filed: Apr. 3, 2000

Related U.S. Application Data

(63) Continuation-in-part of application No. 08/865,386, filed on May 29, 1997, now Pat. No. 6,047,115.

(51) Int. Cl.$^7$ .............................................. G06F 17/50
(52) U.S. Cl. ............................................ 716/16; 716/17
(58) Field of Search ....................... 716/16, 17

(56) References Cited

U.S. PATENT DOCUMENTS

| | | | |
|---|---|---|---|
| 3,775,756 A | 11/1973 | Balser | 712/32 |
| 4,237,545 A | 12/1980 | Deglin et al. | 710/129 |
| 4,288,658 A | 9/1981 | Bieber et al. | 178/3 |
| 4,434,461 A | 2/1984 | Puhl | 710/260 |
| 4,750,155 A | 6/1988 | Hsieh | 365/203 |
| 4,821,233 A | 4/1989 | Hsieh | 365/203 |
| 5,019,996 A | 5/1991 | Lee | 702/60 |
| 5,144,242 A | 9/1992 | Zeilenga et al. | 324/312 |
| 5,224,056 A | 6/1993 | Chene et al. | 716/7 |
| 5,315,178 A * | 5/1994 | Snider | 326/44 |
| 5,349,248 A | 9/1994 | Parlour et al. | 326/38 |
| 5,377,331 A | 12/1994 | Drerup et al. | 710/113 |
| 5,426,378 A | 6/1995 | Ong | 326/39 |

(List continued on next page.)

FOREIGN PATENT DOCUMENTS

JP 53-121537 10/1978

OTHER PUBLICATIONS

Ratha et al, "FPGA–based Computing in Computer Vision," IEEE, May 1997; pp. 128–137.*
Trimberger et al., "A Time–Multiplexed FPGA", IEEE, pp. 22–28, (Jan. 26, 1997).
Li et al., "Routability Improvement using Dynamic Interconnect Architecture", IEEE, pp. 61–67, Jan. 1995.

(List continued on next page.)

*Primary Examiner*—Vuthe Siek
(74) *Attorney, Agent, or Firm*—Jeanette S. Harms

(57) ABSTRACT

An FPGA configuration provides a virtual instruction. In a generic computation, the output pattern of a first instruction is compared to the input pattern of a second instruction. If the input and output patterns of the first and second instructions do not match, then a pattern manipulation instruction is inserted between the first and second instructions. At this point, the input and output patterns of the first and second instructions should match and the computation task can be completed. The method of providing virtual instructions is applicable to any FPGA. In a standard FPGA, the data stored in the storage elements of the FPGA, such as flip-flops, is retained for the next configuration of the FPGA. In this manner, successive configurations can communicate data using the patterns of the storage elements, thereby allowing standard FPGAs to implement virtual instructions. Alternatively, a standard FPGA could write out data to an external memory using a predetermined pattern of addresses. In a subsequent configuration of the FPGA, the device could read data back from this pattern of addresses in the external memory. This embodiment allows various patterns of addresses, corresponding to data, to be used in any appropriate subsequent configuration of the FPGA. In this manner, the plurality of memory planes, previously provided on the dynamically reconfigurable FPGA, can be implemented off-chip.

23 Claims, 9 Drawing Sheets

U.S. PATENT DOCUMENTS

| | | | |
|---|---|---|---|
| 5,426,738 A | 6/1995 | Hsieh et al. ................... | 326/38 |
| 5,426,744 A | 6/1995 | Sawase et al. ............... | 712/228 |
| 5,432,388 A | 7/1995 | Crafts et al. ................... | 326/40 |
| 5,457,644 A | 10/1995 | McCollum .................. | 708/230 |
| 5,469,577 A | 11/1995 | Eng et al. .................... | 710/110 |
| 5,513,124 A | 4/1996 | Trimberger et al. ............ | 716/7 |
| 5,521,835 A | 5/1996 | Trimberger .................. | 716/17 |
| 5,526,276 A | 6/1996 | Cox et al. ..................... | 716/17 |
| 5,530,654 A | 6/1996 | Takahashi .................... | 716/18 |
| 5,583,450 A | 12/1996 | Trimberger et al. .......... | 326/41 |
| 5,590,293 A * | 12/1996 | Uhler et al. ................ | 712/234 |
| 5,600,263 A | 2/1997 | Trimberger et al. .......... | 326/39 |
| 5,629,637 A | 5/1997 | Trimberger et al. .......... | 326/93 |
| 5,646,545 A * | 7/1997 | Trimberger et al. .......... | 326/38 |
| 5,748,979 A * | 5/1998 | Trimberger .................. | 712/37 |
| 5,784,313 A | 7/1998 | Trimberger et al. ........ | 365/182 |
| 5,802,290 A | 9/1998 | Casselman .................. | 709/201 |
| 5,809,319 A * | 9/1998 | Kim ............................ | 712/33 |
| 5,892,962 A * | 4/1999 | Cloutier ....................... | 712/16 |
| 5,970,254 A * | 10/1999 | Cooke et al. ................. | 712/37 |
| 6,047,115 A * | 4/2000 | Mohan et al. ................ | 716/16 |

OTHER PUBLICATIONS

"The Programmable Logic Data Book" copyright 1994, Xilinx, Inc., 2100 Logic Drive, San Jose, CA 95124.

"Principles of CMOS VLSI Design, A Systems Perspective", N. Weste & K. Eshraghian, Addison–Wesley Publishing Company, 1988, pp. 160–164.

Paper presented at IEEE Workshop on FPGA's for Custom Computing Machines, FCCM '93, Apr. 1993 entitled "Virtual Wires: Overcoming Pin Limitations in FPGA–based Logic Emulators", Jonathan Babb, et al. Jan. 26, 1993, pp. 1–15.

"The Programmable Logic Data Book" copyright 1996, published by Xilinx, Inc., 2100 Logic Drive, San Jose, CA 95124, pp. 4–291 to 4–302.

David M. Lewis, "Hierarchical Compiled Event–Driven Logic Simulation", Department of Electrical Engineering, University of Toronto, IEEE, 1989, pp. 498–501.

Trimberger, Stephen M., "A Reprogrammable Gate Array and Applications", Proceedings of the IEEE, vol. 81, No. 7, Jul. 1993, pp. 1030–1041.

Trimberger, Stephen M. and Chene, Mon–Ren, "Placement–Based Partitioning for Lookup–Table–Based FPGAs", IEEE, Computer Design—ICCD '92, 1992 International Conference, pp. 91–94.

Laung–Terng Wang, et al. "SSIM: A Software Levelized Compiled–Code Simulator", 24th ACM/IEEE Design Automation Conference, 1987, Paper 2.1, pp. 2–8.

Randal E. Bryant, et al. "COSMOS: A Compiled Simulator for MOS Circuits", 24th ACM/IEEE Design Automation Conference, 1987, Paper 2.2, pp. 9–16.

Peter M.Maurer, "Scheduling Blocks of Hierarchical Compiled Simulation of Combinational circuits", IEEE Transactions on Computer–Aided Design, vol. 10, No. 2, Feb. 1991, pp. 184–192.

Narasimha B. Bhat, Kamal Chaudhary, and Ernest S. Kuh, "Performance–Oriented Fully Routable Dynamic Architecture for a Field Programmable Logic Device", Electronic Research Laboratory, College of Engineering, University of California, Berkeley, Jun. 1, 1993.

Andre DeHon, "DPGA–Coupled Microprocessors: Commodity ICs for the Early 21st Century", NE43–791, 545 Technology Square, Cambridge, MA 02139, 10 pages, Jan. 6, 1994.

Chi–Yuan Chin et al., "A Dynamically Reconfigurable Interconnection Chip" Session XX: Special Purpose Accelerators; IEEE International Solid State Circuits Conference, pp. 276–177, 425, Feb. 27, 1987.

* cited by examiner

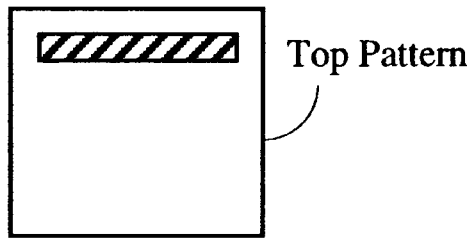
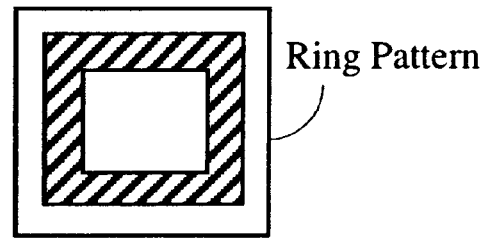
Figure 5A　　　　　　Figure 5B
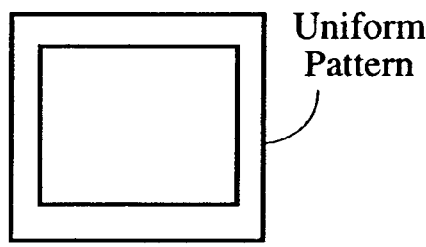
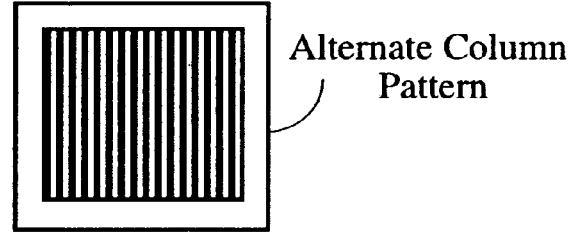
Figure 5C　　　　　　Figure 5D

SYSTEM AND METHOD OF COMPUTATION IN A PROGRAMMABLE LOGIC DEVICE USING VIRTUAL INSTRUCTIONS

RELATED APPLICATION

The present invention is a continuation-in-part of U.S. patent application Ser. No. 08/865,386, filed by Sundararajarao Mohan and Stephen M. Trimberger on May 29, 1997, now U.S. Pat. No. 6,047,115 which is incorporated herein by reference.

BACKGROUND OF THE INVENTION

1. Field of the Invention

This invention relates generally to programmable logic devices, and in particular, to a method of configuring a field programmable gate array for virtual hardware computation.

2. Description of the Related Art

A programmable logic device, such as a field programmable gate array (FPGA), is a well-known type of integrated circuit and is of wide applicability due to the flexibility provided by its reprogrammable nature. An FPGA typically includes an array of configurable logic blocks (CLBs), wherein each CLB is individually configured to perform any one of a number of different logic functions specified by a user (a circuit designer). A programmable interconnect routes signals between the CLBs and the input/output blocks (IOBs) (which interface between the CLBs and the device package pins) according to the desired user circuit design. The FPGA also includes configuration memory cells that are coupled to the CLBs to specify the function to be performed by each CLB, as well as to the programmable interconnect to specify the coupling of the CLBs and IOBs. The FPGA may also include data storage memory cells accessible by a user during operation of the FPGA. However, unless specified otherwise, as used herein, the term "memory cells" refers to the configuration memory cells. The "1996 Programmable Logic Data Book", published by Xilinx, Inc., pages 4–291 to 4–302, describes these configuration memory cells and an exemplary FPGA structure in greater detail, and is incorporated by reference herein.

One approach available in the prior art to increase the complexity and size of logic circuits has been coupling multiple FPGAs by external connections. However, due to the limited number of input/output connections, i.e. pins, provided on the FPGAs, not all circuits can be implemented using this approach. Moreover, using more than one FPGA undesirably increases cost and board space to implement the user circuit design. Another known approach has been increasing the number of CLBs and interconnect resources in the FPGA. However, for any given semiconductor fabrication technology, there are practical limitations to the number of CLBs and interconnect that can be fabricated on an integrated circuit. Thus, there continues to be a need to increase CLB densities for FPGAs.

Reconfiguring an FPGA to perform different logic functions at different times is known in the art. However, this reconfiguration typically requires the step of reloading a configuration bit stream for each reconfiguration. Moreover, reconfiguration of a prior art FPGA generally requires suspending the implementation of the logic functions, saving the current state of the logic functions in a device external to the FPGA, reloading the entire array of memory cells, and inputting the states of the logic functions which have been saved off-chip along with any other needed inputs. Each of these steps requires a significant amount of time, thereby rendering reconfiguration impractical for implementing typical circuits.

U.S. Pat. No. 5,646,545, incorporated herein by reference, discloses an FPGA including CLBs having both combinational and sequential logic elements, an interconnect structure for interconnecting the CLBs, and a plurality of programmable logic elements for dynamically reconfiguring the CLBs and the interconnect structure. At least one programmable logic element includes a plurality of memory cells for configuring the combinational element and at least one programmable logic element includes a plurality of memory cells for configuring the sequential logic element. A plurality of intermediate states of the CLBs and the interconnect structure are stored. In this manner, a CLB can access values calculated by CLBs (other CLBs or itself) in other configurations.

U.S. Pat. No. 5,646,545 teaches three types of FPGA data (implying three types of memory or storage): configuration data, user data, and state data. Configuration data determines the configuration of the logic blocks or interconnect when the data is provided to those logic blocks or interconnect. User data is data typically generated by the user logic and stored/retrieved in memory that could otherwise be used for configuration data storage. State data is data defining the logical values of nodes in user logic at any specific time. Typically, state data is stored if the values at the nodes are needed at a later time. The term "state" is used to refer to either all of the node values at a particular time, or subset of those values. For simplicity, user data and state data are referred to herein as "user data."

The FPGA switches between configurations (also called memory planes) by transferring bits, i.e. of configuration data and user data, from the inactive storage to the active storage, thereby allowing the FPGA to function in one of N configurations, wherein N is equal to the maximum number of memory cells assigned to each programmable point. In this manner, an FPGA with a number M of actual CLBs functions as if it includes M times N effective CLBs. Thus, assuming eight configurations, the FPGA implements eight times the amount of logic that it actually contains by including the additional configuration memory. By using this type of reconfiguration, the CLBs are reused dynamically, thereby reducing the number of physical CLBs needed to implement a given number of logic functions in a particular user's circuit design by the factor of the number of configurations.

It is therefore a principal object of the present invention to provide a method for configuring memory planes in a dynamically reconfigurable FPGA for carrying out extremely fast computations.

It is another object of the invention to provide a method to utilize on-chip memory locations to store virtual instructions for configuration data to perform a computation in the FPGA.

It is another object of the invention to provide a method for carrying out computations in an FPGA without using external memory by employing virtual instructions to cause data stored on a memory plane of each tile of the FPGA to be copied to tile-local memory elements.

It is still another object of the invention to provide a method for providing a sequence of virtual instructions stored in the memory planes of a dynamically configured FPGA and utilizing the FPGA routing programmability to translate data stored in a first pattern of FPGA storage elements into data stored in a second pattern of FPGA storage elements.

SUMMARY OF THE INVENTION

In one embodiment of the present invention, a dynamically reconfigurable FPGA includes an array of tiles wherein each tile has a local memory. The memory address for this local memory is defined only within the tile. In one embodiment, the local memory includes memory cells and micro registers. The present invention uses this local memory to pass large amounts of configuration and user data from one FPGA configuration (memory plane) to another with no external memory access, thereby transferring data to/from the memory cells at very high speed. Typically, all the local memory can be simultaneously transferred to/from other memory planes in one cycle. In accordance with the present invention, each FPGA configuration provides a virtual instruction.

The present invention uses two different types of virtual instructions: computational instructions and pattern manipulation instructions. Computational instructions perform some computation with user data stored in some well-defined local memory pattern. Pattern manipulation instructions move the local data into different memory locations to create the pattern required by the next instruction. A virtual computation may be accomplished by a sequence of instructions that work with pre-defined input and output patterns.

In accordance with one embodiment, a set of standard memory transfer patterns are defined to allow designers to independently design sequences of FPGA configurations for the virtual hardware with pre-defined interface patterns. These patterns allow large amounts of data to be passed from one instruction to another without external memory access, thereby speeding up the virtual computation compared to prior methods. Each pattern is defined as a spatial-temporal set of locations in the FPGA logic block array. The spatial dimension specifies the two-dimensional coordinates of the memory word in the tile array. The temporal dimension defines the relative sequence number in the sequence of FPGA configurations seen by the virtual hardware.

By limiting the number of input/output patterns, a complete library of pattern transfer and commonly used computation functions is created. These library functions or instructions are available as FPGA configuration data (i.e. bitstreams), thereby allowing long sequences of virtual hardware instructions to be created without having to enumerate all possible FPGA configurations or to wait for each FPGA configuration to be generated by the FPGA place-and-route tools with data location constraints passed from one configuration to the next. In another embodiment, the user has the option of generating custom made instructions using the FPGA place-and-route tools.

Pattern manipulation instructions configure the FPGA routing resources to move the data as required. Because this routing problem is much simpler than the problem of generating a normal FPGA configuration using place-and-route tools, this task can typically be performed much faster than prior art methods, depending on the size and patterns of the data to be moved. Thus, these instructions allow extra computational power to be packed into an FPGA by relaxing the data placement constraints and moving the routing cost to the next/previous pattern transfer configuration.

In the present invention, the virtual instructions can be created or accessed by any process. Thus, providing a virtual instruction library is only one of many ways known by those skilled in the art to access virtual instructions. For example, in one embodiment, a user can access a template in a library of templates. These templates can then be customized with the required functionality, thereby building the appropriate virtual instruction. The library can also include the parameters available for customizing the template. In other embodiments, the templates can be customized by the user directly, for example by using a graphical user interface (GUI). In accordance with another embodiment of the present invention, an input/output pattern can be added to the template. In this manner, all virtual instructions can be customized to have the same input/output patterns, thereby greatly simplifying the computation task. In yet another embodiment, the input/output pattern is alternated. Finally, in a fully customized embodiment, the user can build the virtual instruction from scratch.

Assuming a computation system may have different input/output patterns, then an output pattern of a first instruction is compared to an input pattern of a second instruction. If the input and output patterns of the first and second instructions do not match, then a pattern manipulation instruction is inserted between the first and second instructions. At this point, the input and output patterns of the first and second instructions should match and the computation task can be completed. In one embodiment, the first input pattern and the first output pattern are the same. In the same embodiment, or in a separate embodiment, the second input pattern and the second output pattern are the same.

The pattern manipulation instructions, like the virtual instructions, can be created or accessed by different processes. In one process, the pattern manipulation instruction is chosen from a library of such pattern manipulation instructions. The library can be created by the user, the manufacturer, or a third party. In another process, pattern manipulation instruction is created by generating a new FPGA configuration.

Of importance, the present invention is equally applicable to any standard FPGA. In this embodiment, the data stored in the storage elements of the FPGA, such as flip-flops, is retained for the next configuration of the FPGA. In this manner, successive configurations can communicate data using the patterns of the storage elements, thereby also allowing these standard FPGAs to implement virtual instructions.

Alternatively, a standard FPGA could write out data to an external memory using a predetermined pattern of addresses. In a subsequent configuration of the FPGA, the device could read data back from this pattern of addresses in the external memory. This embodiment allows various patterns of addresses, corresponding to data, to be used in any appropriate subsequent configuration of the FPGA. In this manner, the plurality of memory planes, previously provided on the dynamically reconfigurable FPGA, can be implemented off-chip.

The method of communicating to subsequent configurations by storing data in patterns can also refer to partial configurations of FPGAs that overlap in physical space, but are sequential in time. For example, if a first partial configuration occupies a first area on the FPGA and a second partial configuration occupies a second area on the FPGA which overlaps the first area, then the first configuration can store data in a pattern of storage elements restricted to the second area. In this manner, when the second configuration is activated, the second configuration can retrieve those data values from the second area.

Of importance, pattern manipulation instructions, can also be extended to allow communication between partial configurations that do not overlap in physical space or time. If a first configuration occupies a first area on the FPGA and the second configuration occupies a second non-overlapping area on the FPGA the present invention creates a pattern manipulation instruction to occupy an area comprising both first and second areas. This instruction allows data to be conveyed from the first configuration to the second configuration both spatially and temporally.

BRIEF DESCRIPTION OF THE DRAWINGS

FIGS. 5A–5D illustrate useful input and/or output patterns which may be utilized in the process of the invention.

DETAILED DESCRIPTION OF THE DRAWINGS

An instruction set of a conventional processor typically covers all possible hardware functionality. Specifically, if the processor can perform some function on its input data within one cycle, there is a specific instruction in the instruction set that configures the processor to perform this function. While a conventional processor has a few functional units such as an ALU, a floating-point unit, a register file, etc., an FPGA has hundreds of CLBs, thereby making it impractical to define a separate instruction for every possible FPGA configuration. Given a functional specification, a corresponding FPGA configuration can be generated using conventional FPGA place and route tools, but this can be a time-consuming process requiring several minutes to several hours of CPU time on a state-of-the-art workstation.

Moreover, a conventional processor has a small instruction word with only a few bits in the instruction word available for storing immediate data. Hence, data manipulation is achieved mainly by access to memory elements, such as registers, cache, RAM, and disk, which are external to the processor. However, each access to an instruction in the external memory entails a predetermined delay. Thus, conventional processor instructions which require multiple memory accesses create memory access bottlenecks.

While typical FPGAs can access external memory, physical limitations on the number of pins on the FPGA restrict the amount of data that can be read or written to/from external memory in each instruction cycle. Addressing data that is stored externally in several disjoint (non-consecutive) memory locations poses another problem. Thus, known techniques using conventional FPGAs would require multiple memory cycles to read/write this data.

Figure 1:
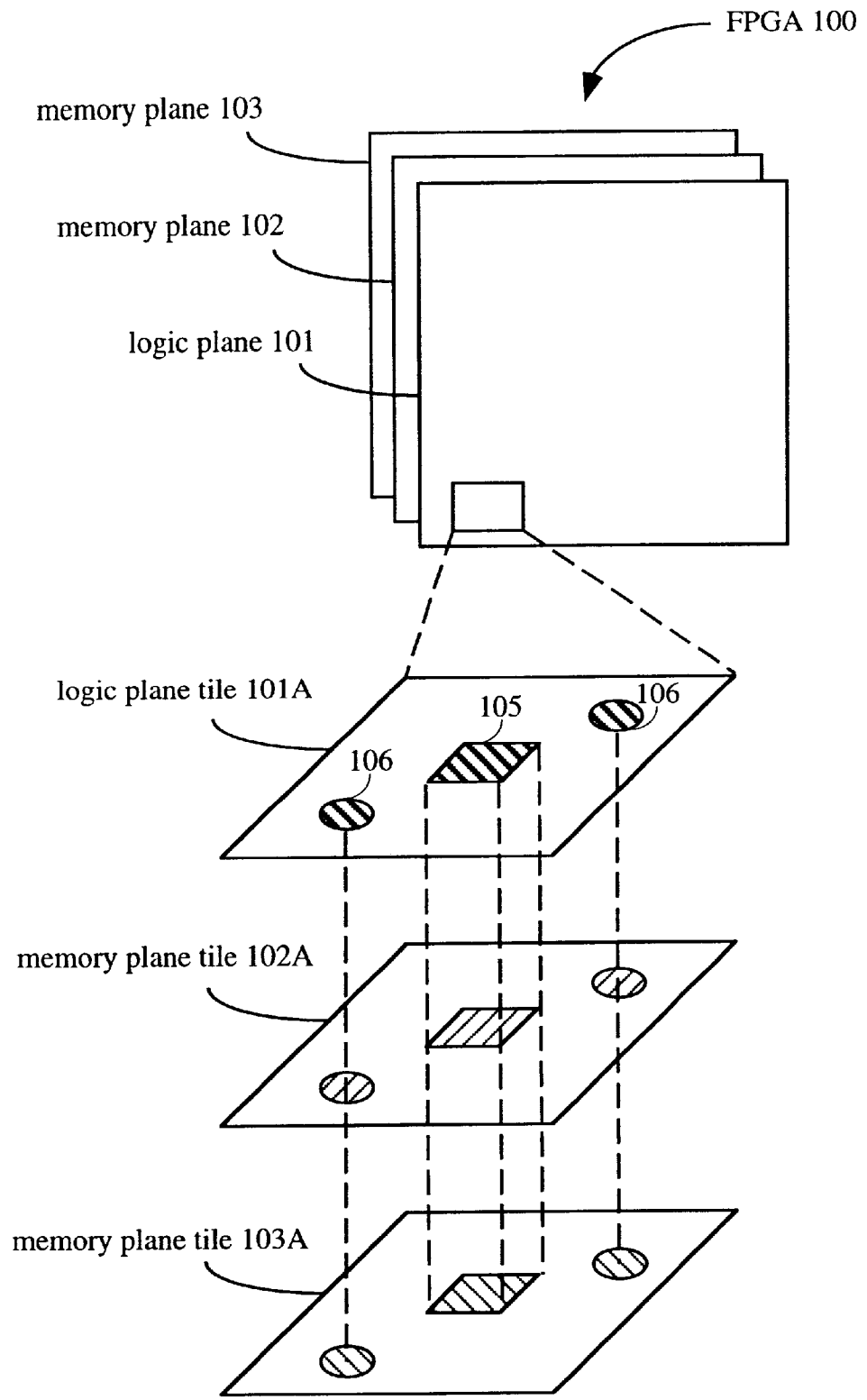
FIG. 1 is a conceptual block diagram illustrating the FPGA architecture in which the method of the invention may be carried out.

In the present invention, virtual hardware computation can be done using an FPGA. In one embodiment, a dynamically reconfigurable FPGA (see, for example, the FPGA described in U.S. Pat. No. 5,646,545) is used. The reconfiguration of such an FPGA is performed in a few clock cycles—typically less than 1 $\mu$sec. FIG. 1 conceptually illustrates a dynamically reconfigurable FPGA 100 including a logic plane 101 having a plurality of tiles (only tile 101A is shown for simplicity). Each tile has a CLB and programmable routing for interconnecting the CLBs (neither shown). The configuration points 106 on logic plane tile 101A (for configuring the CLB and programmable routing of that tile) are configured by data in the memory planes. In this example, FPGA 100 includes memory planes 102 and 103. Thus, the logic function provided by logic plane tile 101A can be instantly changed by allowing data from either memory plane tile 102A or 103A to configure configuration points 106.

In one embodiment, each CLB includes storage devices 105 that are available to store user data. Storage devices 105 may include, for example, microregisters or other storage devices such as look-up tables, flip-flops, or RAM bit locations. The data stored in storage devices 105 can be copied to or from corresponding memory locations in either memory plane tiles 102A or 103A.

The elements for storing the configuration data for configuring configuration points 106 and the user data for storage elements 105 form the local memory of the present invention. Thus, in a dynamically reconfigurable FPGA, there is a wealth of distributed local memory available. Moreover, these data are available without the memory access bottlenecks of a conventional processor caused by reading and writing external memory.

In accordance with the present invention, each FPGA configuration on logic plane 101 provides a single instruction (also called a virtual instruction). Two types of virtual instructions are provided: computational and pattern manipulation. Computational instructions perform computations with the user data stored in local memory. Pattern manipulation instructions move the user data into different locations to create the pattern required by the next instruction. A sequence of virtual instructions, which may include both computational and pattern manipulation instructions, provides a computation.

Figure 2:
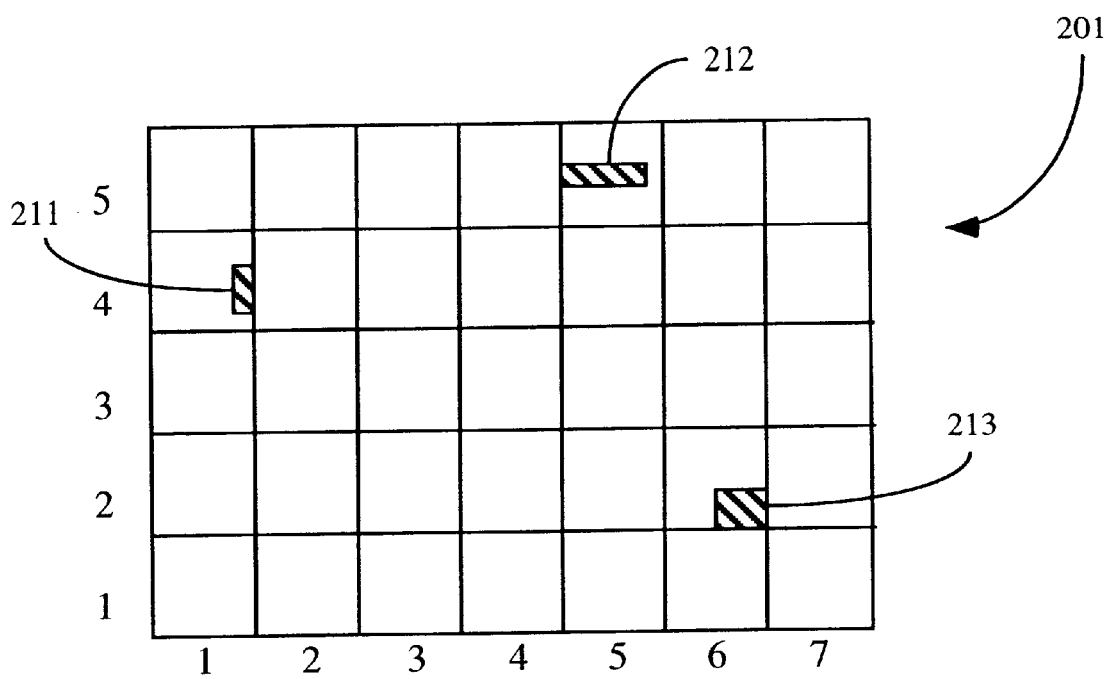
FIG. 2 illustrates a data pattern for a virtual instruction.

To facilitate retrieval of and subsequent computation on the user data, it is stored in local memory in a predetermined pattern. FIG. 2 illustrates one example of a pattern for a virtual instruction. In this example, a memory plane 201 (with corresponding locations on the logic plane) is divided into a 7x5 array of tiles. Elements 211, 212, and 213 are defined by their tile locations (i.e. (x,y) coordinates) in memory plane 201 (with corresponding locations on the logic plane) as well as by their element designations and widths. For example, element 211 at location (1,4) might store user data for a 1-bit D-type flip-flop and element 213 at location (6,2) might store user data for an 8-bit look-up table.

Figure 3C:
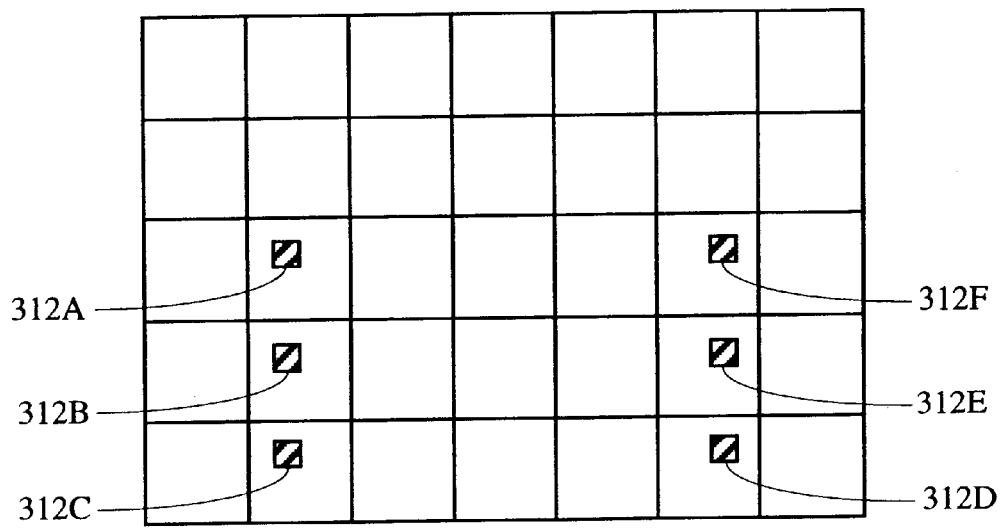
FIGS. 3A–3C show a sequence of pattern translation using FPGA interconnect.
Figure 3A:
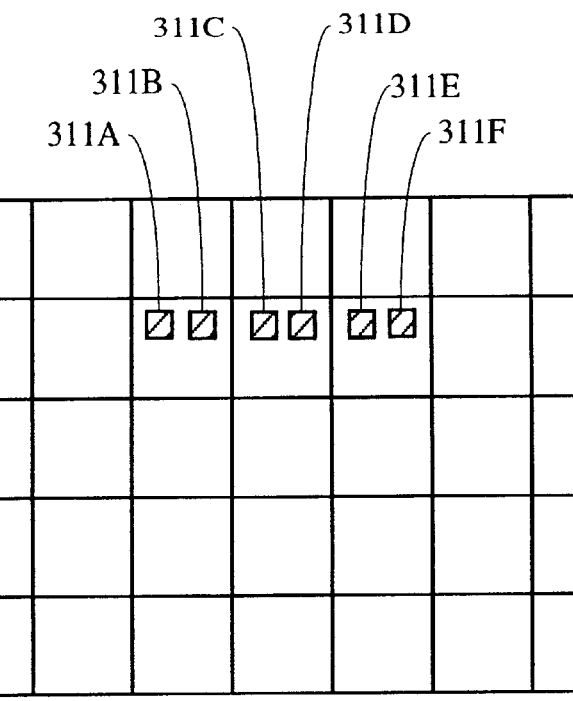
Figure 3B:
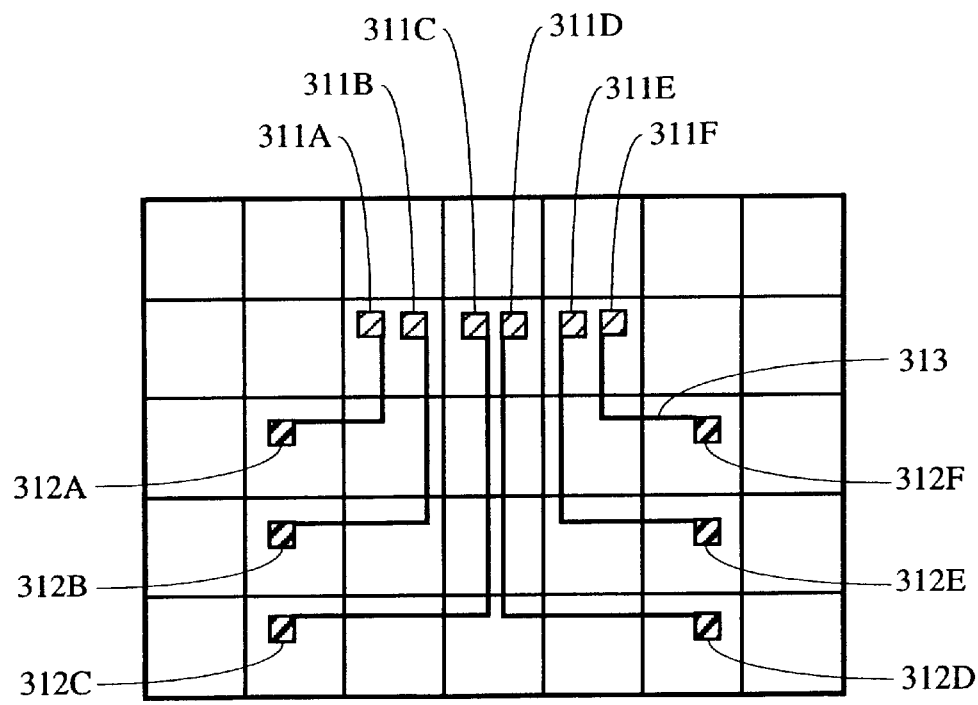

FIGS. 3A–3C illustrate how a pattern manipulation instruction and the programmable routing of the FPGA are used to move user data stored in a first pattern to a second pattern. Specifically, in FIG. 3A, a first local memory pattern includes a plurality of elements 311A–311F. Routing 313, shown in FIG. 3B, connects elements 311A–311F to elements 312A–312F, respectively. After the appropriate pattern manipulation instruction is received, the user data stored in elements 311A–311F are transferred to elements 312A–312F, respectively. In this manner, the second pattern is created as shown in FIG. 3C.

In the present invention, pre-defined input and output patterns allow FPGA designers to build virtual hardware "subroutines". Using these pre-defined patterns eliminates the prior art wait cycles for accessing external memory and ensures that the computation proceeds at optimal speed. For example, a simple sorting function may be implemented with a single instruction corresponding to a hardware sorting algorithm with all of the input data in a single horizontal row of elements at the top of an FPGA logic block array and all of the output data, fully sorted, in a single horizontal row of elements at the bottom of the array.

Sorting an array that is twice the length of a row of elements may be accomplished by a sequence of sorts and merges. A virtual hardware sorting algorithm sorts 2N numbers given the following hardware and pre-defined modules:

1) hardware to sort N numbers stored in a particular pattern;
2) hardware to merge two lists of size N/2 of sorted numbers into a single list of size N; and
3) pattern manipulation modules.

The virtual hardware sorting algorithm consists of a sequence of configurations that provide the desired computation. The input data to each configuration is either loaded along with the FPGA configuration data or is already present on the FPGA.

FIGS. 4A–4E show a plurality of input/output patterns used for the sorting of 2N numbers. Seven virtual instructions 401–407 (i.e. FPGA configurations)(listed below) are provided for this sorting operation. These instructions use pre-defined templates for sorting and merging N numbers along with two different pattern manipulation instructions called Pattern 1 and Pattern 2.

2N SORTING OPERATION

{Sort N (1,N) Instruction 401
Sort N(N+1,2N) Instruction 402
MergeA Instruction 403
MergeB Instruction 404
Pattern1 Instruction 405
SortN Instruction 406
Pattern2} Instruction 407

Figure 4A:
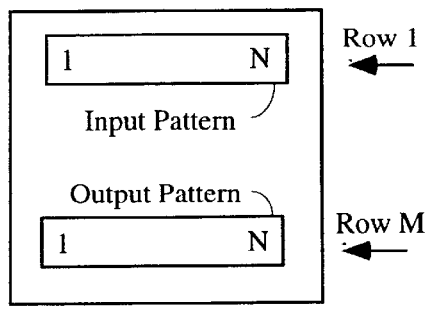
FIGS. 4A–4F illustrate a sequence of virtual instructions for carrying out an illustrative sorting process.

Instruction 401, Sort N (1,N), sorts N numbers of a first memory plane in the top row, Row 1 in FIG. 4A (input pattern) and places the sorted numbers in the bottom row, Row M (output pattern) of the first memory plane. Similarly, instruction 402, Sort N(N+1,2N), sorts N numbers (N+1 to 2N) of a second memory plane in the top row and places the output along the bottom row of the second memory plane.

Figure 4B:
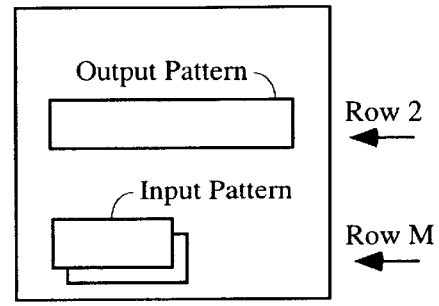

Instruction 403, Merge A, sorts the left half of the first list of sorted numbers on the first memory plane with the left half of the second list of sorted numbers on the second memory plane (input pattern) to produce a list of N sorted numbers (output pattern) in the second row from the top on the first memory plane, Row 2 in FIG. 4B. In this manner, the left half of Row 2 (first memory plane) now has the N/2 smallest numbers in the original sequence in correct sorted order.

Figure 4C:
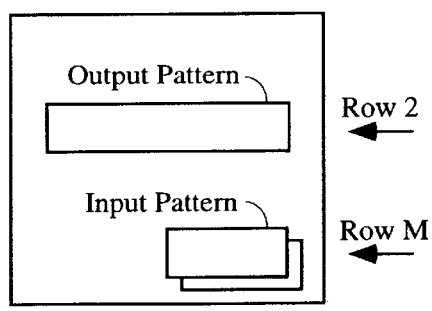

Instruction 404, Merge B, sorts the right half of the first list of sorted numbers on the first memory plane with the right half of the second list of sorted numbers on the second memory plane (input pattern) and places the output on the second memory plane in Row 2 (output pattern) as shown in FIG. 4C. In this manner, the last N/2 numbers in Row 2 (second memory plane) have the biggest N/2 numbers in the original sequence, in sorted order.

Figure 4D:
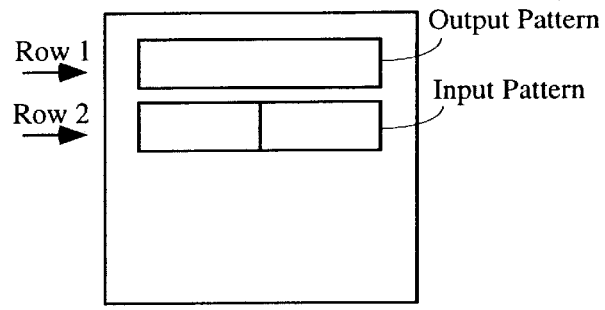
Figure 4E:
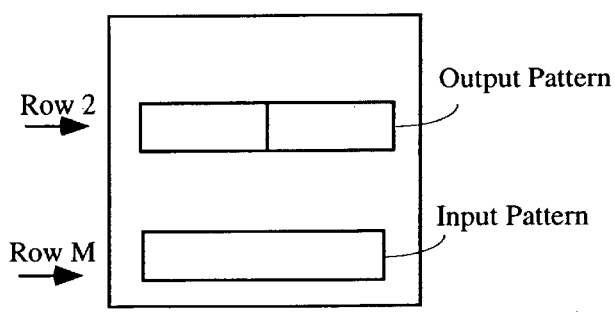
Figure 4F:
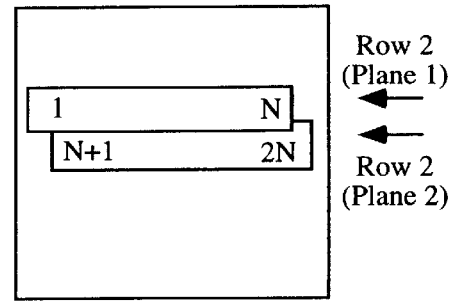

The next step is to sort the N/2 numbers in the right half of Row 2 (first memory plane) and the N/2 numbers in the left half of Row 2 (second memory plane)(input pattern in FIG. 4D). In order to re-use the same hardware, these N numbers are moved into Row 1 of memory plane 1 by using instruction 405, Pattern 1. Instruction 406, SortN, sorts these numbers and moves the output to Row M on the first memory plane. Instruction 407, Pattern2, moves these numbers to Row 2 of the same plane. A single sorted sequence of 2N numbers is formed in the first and second memory planes, both in Row 2, as shown in FIG. 4F.

As described briefly above, the present invention pre-defines a set of standard memory transfer patterns, thereby allowing FPGA designers to independently design subroutines or sequences of FPGA configurations for virtual hardware. These patterns allow large amounts of data to be passed from one instruction to another without external memory access, thereby significantly speeding up computation compared to prior art microprocessor operation. Each pattern is defined as a spatial-temporal set of locations in the FPGA logic block array. The temporal dimension defines the relative sequence number in the sequence of FPGA configurations seen by the virtual hardware. The spatial dimension specifies the two-dimensional coordinates of the memory word in the FPGA logic block array. For example, a line pattern consisting of the entire top row of memory locations such as discussed in conjunction with FIG. 4A, may be referred to as __(−1, (0,*))__, wherein the representation has the form (time-sequence number, (X, Y)) for each memory location, "__" denotes the set of locations, and "★" denotes all possible values for that location.

FIGS. 5A–5D show illustrative input and/or output patterns. Pattern manipulation instructions move data from a specified input pattern to another pattern (for example, from UNIFORM (FIG. 5C) to ALTERNATE COLUMN (FIG. 5D), or from TOP (FIG. 5A) to RING (FIG. 5B). Pattern manipulation instructions may also move bits among the flip-flops, LUTs, RAMs, I/O blocks, and other data storage elements. Data size and routing resources determine the time required each such instruction to execute. This set of patterns should not be considered an exhaustive set and some designs might have special requirements. For example, one design may be a chip for a fingerprint match that uses a specific pattern based on the fingerprint.

By selecting a limited number of input and output patterns, a library of pattern manipulation and computational instructions is created. For example, patterns may be limited to 1) regular patterns with not more than N items, or 2) patterns that appear most often in some set of benchmarks. A library may be considered "complete" if every pattern that satisfies the limiting rules above is in the set. These instructions (also called library functions) are available in the form of bitstreams of FPGA configuration data, thereby eliminating the need for the user to use standard FPGA place-and-route tools each time. Therefore, the library of the present invention allows long sequences of virtual hardware instructions to be created without having to 1) enumerate all possible FPGA configurations, or 2) wait for each FPGA configuration to be generated by the FPGA place-and-route tools with data location constraints passed from one configuration to the next. In other embodiments, the user has the option of generating custom-made instructions using standard FPGA place-and-route tools.

Pattern manipulation instructions necessitate that the FPGA programmable routing resources be configured to move the data as required. Because configuring the programmable routing is significantly simpler than generating a standard FPGA circuit configuration using place-and-route tools, this configuration operation can be typically performed much faster than prior art place-and-route operations, depending on the size and patterns of the data to be moved. Hence, the present invention allows extra computational power to be packed into a given FPGA by relaxing the data placement constraints and moving the routing cost on to the next/previous configuration.

A sequence of virtual hardware instructions can be shortened by combining some logic functionality with dynamically generated pattern manipulation instructions. Typically, pattern manipulation instructions use the routing resources but not the logic capability of the FPGA. However, simple logic functions can be combined with dynamic pattern manipulation instructions without incurring extra cost. For example, a pattern manipulation instruction that moves all the numbers from the top row to the corresponding columns in the bottom row can additionally perform a Boolean operation (AND, OR, NOR etc.) without incurring significant extra delay, both in terms of the time to generate the configuration and in terms of the execution time of the new instruction. Therefore, in some embodiments, the present invention advantageously predefines some virtual instructions and uses rapidly generated data-manipulation instructions between virtual instructions to move data to where it is needed.

An established library of virtual instructions (i.e. configuration data) for a given FPGA can accomplish most standard computational functions (i.e. multiply, add, sort, merge, compare, subtract, invert, etc.), as well as much more complex and specialized instructions (such as Fourier transformations, MPEG decoders, image enhancement, etc.). Using such a library, a designer can easily assemble a sequence of instructions.

Figure 6A:
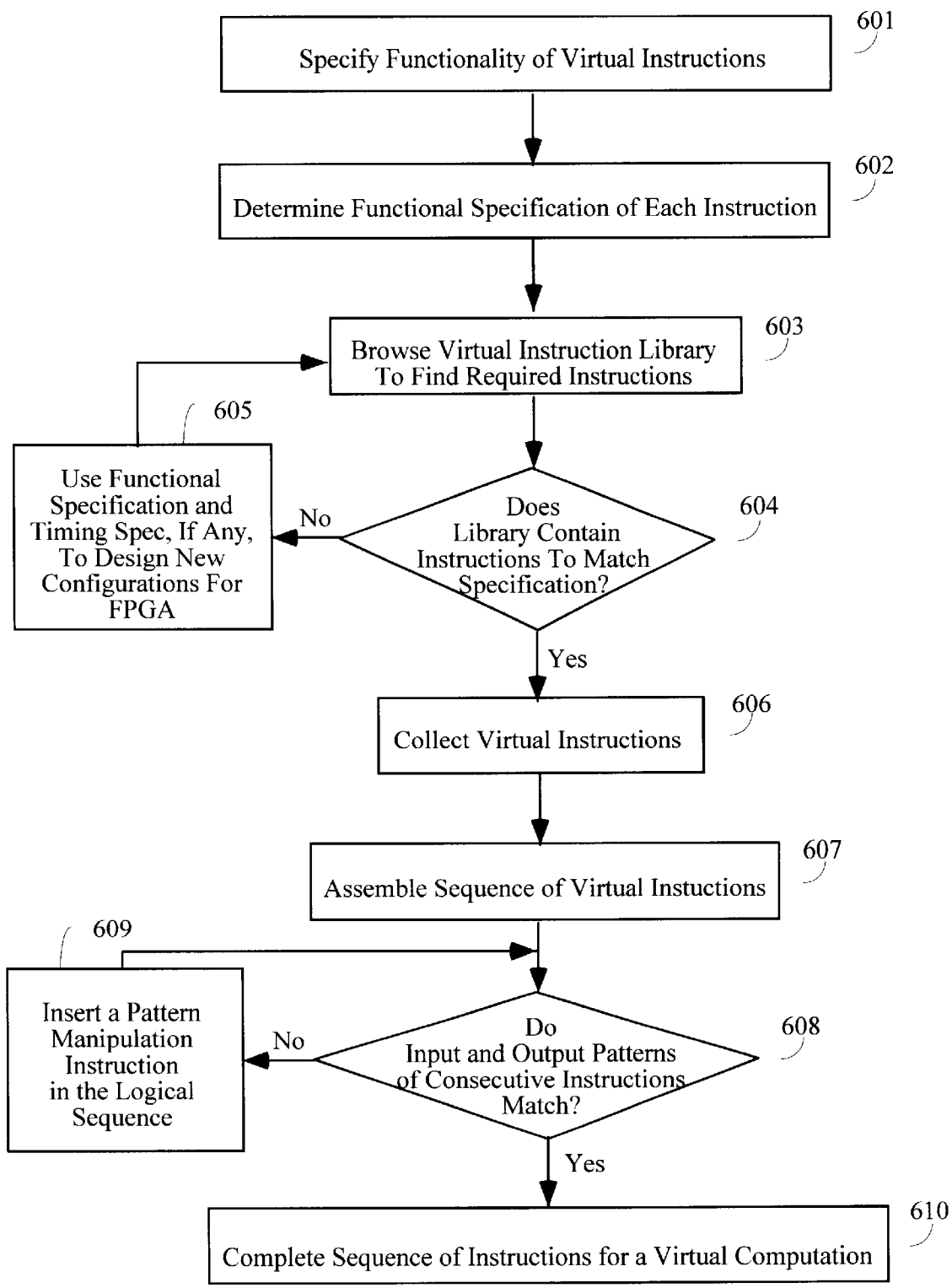
FIG. 6A is a flow chart of the steps for designing a virtual hardware computation in accordance with the present invention.

FIG. 6A illustrates the steps in one embodiment of the invention for augmenting the library to provide additional instructions for a virtual computation. Specifically, step 601 specifies the functionality of the virtual instructions needed to perform the entire computation. Step 602 determines the functional specification of the corresponding virtual instruction. Step 603 searches the instruction library for the required virtual instructions. If the library fails to contain the virtual instructions as determined in step 604, then the functional specification and timing specification, if any, are used to design the new configuration data for the FPGA. (Note that the resulting configuration data are the needed virtual instructions and may be added to the library for later use in another design effort.)

If the library contains the instructions to match the specifications, then all the designated virtual instructions are collected in step 606 and assembled in a sequence in step 607. If the input and output patterns of consecutive instructions do not match, then a pattern manipulation instruction is inserted in the sequence in step 609. If the input and output patterns match, then step 610 saves the sequence of instructions.

In accordance with the present invention, the virtual instructions can be created or accessed by any process. Thus, providing a virtual instruction by using a library (see, the process shown in FIG. 6A) is only one of many ways known by those skilled in the art to create, access, or amend virtual instructions. For example, in one embodiment, a user can access a template in a library of templates. These templates can then be customized with the required functionality, thereby building the associated virtual instruction. The library can also include the parameters available for customizing the template. In other embodiments, the templates can be customized by the user directly, for example by using a graphical user interface (GUI). In accordance with another embodiment of the present invention, an input/output pattern can be added to the template. In this manner, all virtual instructions can be customized to have the same input/output patterns, thereby greatly simplifying the computation process. In yet another embodiment, the input/output pattern is alternated similar to a two-phase circuit. Finally, in a fully customized embodiment, the user can build the virtual instruction from scratch.

Figure 6B:
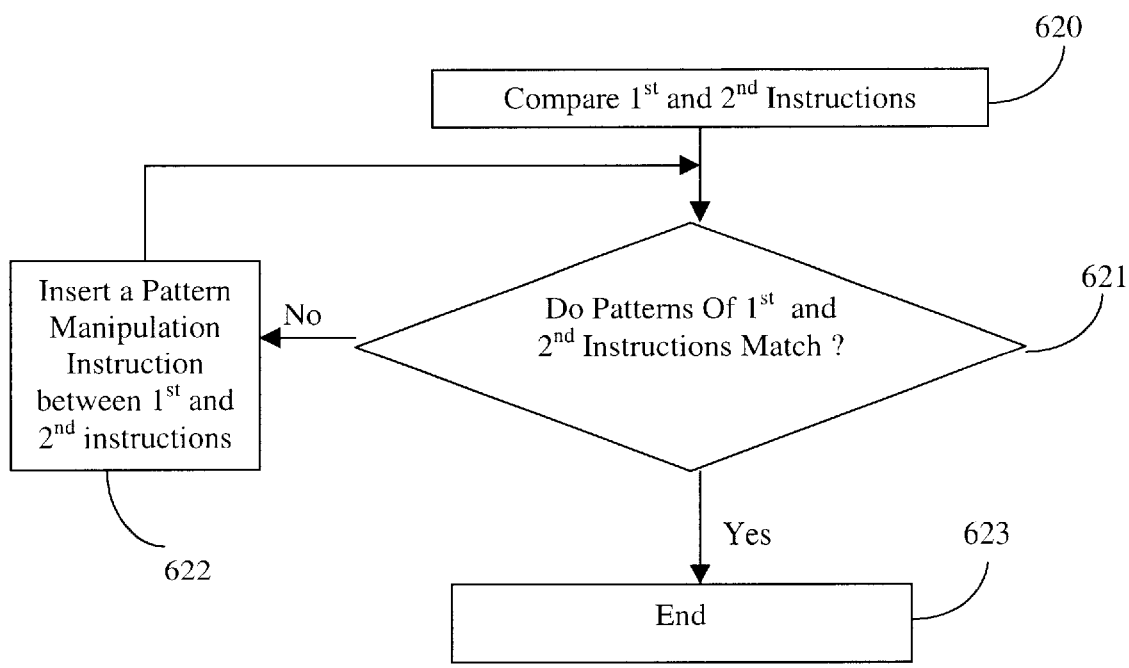
FIG. 6B is a flow chart of the steps for a generic virtual hardware computation in accordance with another embodiment of the present invention.

FIG. 6B illustrates the steps of a generic computation including a first instruction and a second instruction. In step 620, the output pattern of the first instruction is compared to the input pattern of the second instruction. If the input and output patterns of the first and second instructions do not match as determined by step 622, then a pattern manipulation instruction is inserted between the first and second instructions in step 622. At this point, the input and output patterns of the first and second instructions should match (confirmed in step 622) and the computation task can be completed in step 623.

In one embodiment, the first input pattern and the first output pattern are the same. In the same embodiment, or in a separate embodiment, the second input pattern and the second output pattern are the same.

The above-described pattern manipulation instructions, like the virtual instructions, can be created or accessed by different processes. In one process, the pattern manipulation instruction is chosen from a library of such pattern manipulation instructions. The library can be created by the user, the manufacturer, or a third party. In another process, pattern manipulation instruction is created by generating a new FPGA configuration.

Although the present invention is described in reference to a time-multiplexed FPGA as described in U.S. Pat. No. 5,646,545, the present invention is equally applicable to any standard FPGA. For example, the virtual instructions of the present invention can be easily implemented in the Virtex™ or the XC4000™ family of devices sold by Xilinx, Inc. Although this implementation affects the performance (i.e. thousands of clock cycles in the Virtex FPGA versus less than 10 clock cycles in the time-multiplexed FPGA), the present invention still offers significant advantages for any FPGA. Specifically, in one embodiment, the data stored in the storage elements of the FPGA, such as flip-flops or micro-registers, is retained for the next configuration of the FPGA. In this manner, successive configurations can communicate data using the patterns of the storage elements, thereby also allowing these FPGAs to implement virtual instructions.

Alternatively, a standard FPGA could write out data to an external memory using a predetermined pattern of addresses. In a subsequent configuration of the FPGA, the device could read data back from this pattern of addresses in the external memory. This embodiment allows various patterns of addresses, corresponding to data, to be used in any appropriate subsequent configuration of the FPGA. In this manner, the plurality of memory planes (see, for example, FIG. 1), can be implemented off-chip.

Figure 7A:
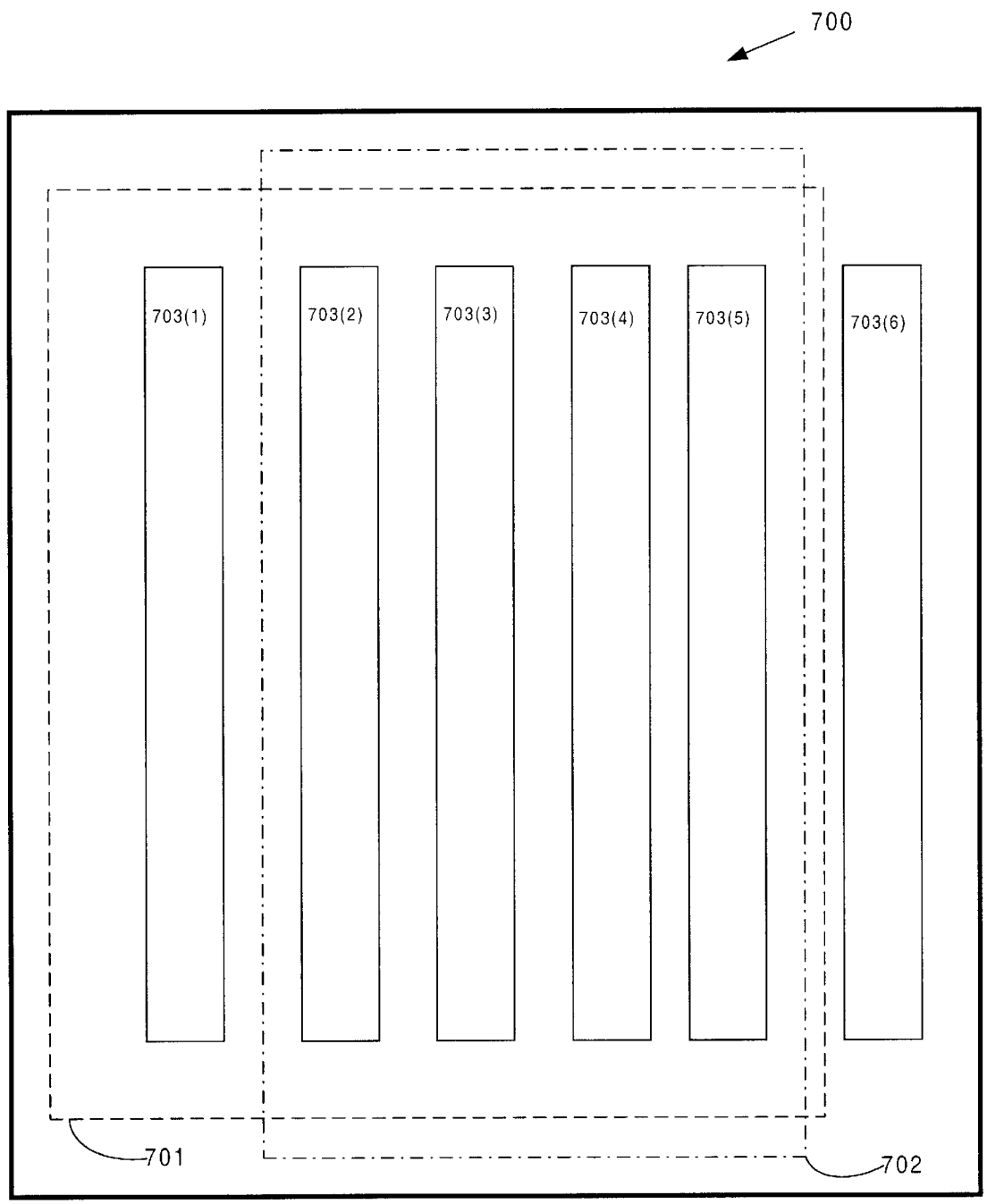
FIG. 7A illustrates two partial configurations that overlap in space, but are sequential in time.

The method of communicating to subsequent configurations by storing data in patterns can also refer to partial configurations of FPGAs that overlap in physical space, but are sequential in time. For example, referring to the FPGA 700 shown in FIG. 7A, partial configuration 701 could occupy columns 703(1) to 703(5) and partial configuration 702 could occupy columns 703(2) to 703(5) (note that a column refers to a line of CLBs in the CLB array). In accordance with the present invention, configuration 701 can store data in a pattern of storage elements restricted to columns 703(2) to 703(5). Configuration 702, when activated, retrieves those data values from columns 703(2) to 703(5).

Figure 7B:
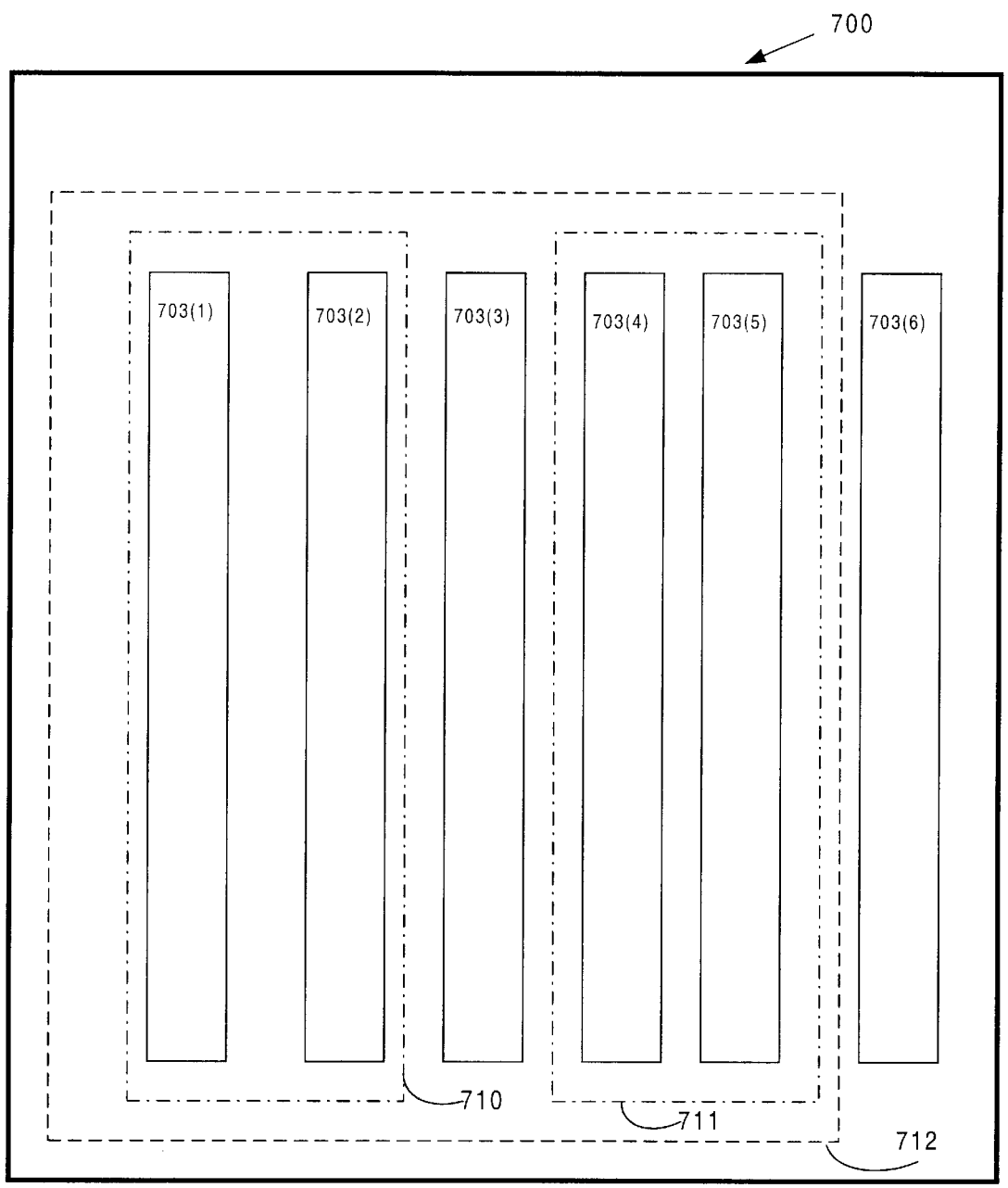
FIG. 7B illustrates two partial configurations that do not overlap in space or in time.

Of importance, pattern manipulation instructions, can also be extended to allow communication between partial configurations that do not overlap in physical space or time. For example, referring to FIG. 7B, if configuration 710 occupies columns 703(1) to 703(2) and configuration 711 occupies columns 703(4) to 703(5) at a different instant in time than configuration 710, then the present invention creates a pattern manipulation instruction 712 to occupy columns 703(1) to 703(5). This instruction allows data to be conveyed from configuration 710 to configuration 711 both spatially and temporally.

Those skilled in the relevant art will now, as a result of the disclosure herein, perceive various additions and modifications that may be made to the invention. However, all such additions and modifications are deemed to be within the scope of the invention which is to be limited only by the appended claims and their equivalents.

What is claimed is:

1. A method for computation in a programmable logic device (PLD), the PLD including a logic plane and a plurality of memory planes, the method comprising:
   determining a first instruction of a computation task, wherein the first instruction has a first input pattern and a first output pattern;
   determining a second instruction of the computation, wherein the second instruction has a second input pattern and a second output pattern, further wherein the second instruction receives data from the first instruction; and
   comparing the first output pattern to the second input pattern,
   wherein if the first output pattern fails to match the second input pattern, then inserting a pattern manipulation instruction, and
   wherein if the first output pattern matches the second input pattern, then completing the computation task.

2. The method of claim 1, wherein the first input pattern and the first output pattern are the same.

3. The method of claim 1, wherein the second input pattern and the second output pattern are the same.

4. The method of claim 1, wherein the step of inserting includes choosing the pattern manipulation instruction from a library.

5. The method of claim 1, wherein the step of inserting includes creating the pattern manipulation instruction by generating a new PLD configuration.

6. A method for computation in a programmable logic device (PLD), the PLD including a logic plane and at least one memory plane, the method comprising:
   providing a first virtual instruction corresponding to a first configuration of the logic plane;
   providing a second virtual instruction corresponding to a second configuration of the logic plane;
   wherein the first virtual instruction provides a predetermined data pattern on the memory plane to the second virtual instruction.

7. The method of claim 6, wherein the predetermined data pattern is provided by a plurality of storage elements.

8. The method of claim 7, wherein at least one of the storage elements is a flip-flop.

9. The method of claim 6, wherein the first configuration directs the PLD to write out data to a predetermined pattern of addresses in an external memory and the second configuration directs the PLD to read data back from the predetermined pattern of addresses.

10. The method of claim 9, wherein the first and second configurations are successive.

11. The method of claim 9, wherein at least one other configuration is performed between the first and second configurations.

12. The method of claim 6, wherein the first configuration is a partial configuration occupying a first physical area of the PLD and the second configuration is another partial configuration occupying a second physical area of the PLD.

13. The method of claim 12, wherein the second physical area overlaps the first physical area.

14. The method of claim 13, wherein the predetermined data pattern is stored only in the second physical area.

15. The method of claim 14, wherein the second configuration, when activated, retrieves the predetermined data pattern from the second physical area.

16. The method of claim 12, wherein the second physical area does not overlap the first physical area.

17. The method of claim 16, further including creating a pattern manipulation instruction to include both the first and second physical areas.

18. A computation system for a programmable logic device, the system comprising:
   a virtual instruction library, wherein each virtual instruction operates on user data in the programmable logic device, wherein the virtual instruction library includes a plurality of templates.

19. The system of claim 18, wherein at least one template can be customized with additional functionality.

20. The system of claim 18, wherein the virtual instruction library further includes a plurality of parameters for customizing the plurality of templates.

21. The system of claim 19, further includes a user interface to allow customizing the plurality of templates.

22. The system of claim 18, wherein the virtual instruction library further includes a plurality of input/output patterns.

23. The system of claim 18, further including a user interface to allow creating virtual instructions.

* * * * *